United States Patent [19]

French et al.

[11] Patent Number: 4,877,293
[45] Date of Patent: Oct. 31, 1989

[54] LOAD BRIDGING DUMP TRAILER

[76] Inventors: Paul H. French, Rte. 3, Box 135;
Craig P. French, Rte. 3, Box 135A,
both of Suring, Wis. 54174

[21] Appl. No.: 728,200

[22] Filed: Apr. 29, 1985

[51] Int. Cl.$^4$ .............................................. B62D 21/14
[52] U.S. Cl. ................................. 298/17 R; 280/405.1;
280/423.1
[58] Field of Search .................... 280/142, 482, 405 R,
280/405 A, 423 R; 414/495; 298/17 R

[56] References Cited

U.S. PATENT DOCUMENTS

| | | | |
|---|---|---|---|
| 3,043,628 | 7/1962 | Hockensmith, Jr. | 280/423 R X |
| 3,163,306 | 12/1964 | Bennett et al. | 280/423 R X |
| 3,420,390 | 1/1969 | Taggart | 280/482 X |
| 3,508,762 | 4/1970 | Pratt | 280/405 A X |
| 3,921,128 | 11/1975 | Snead | 298/17 R X |

FOREIGN PATENT DOCUMENTS 1522677  3/1968  France .................... 280/142

Primary Examiner—Robert J. Spar
Assistant Examiner—Janice Krizek
Attorney, Agent, or Firm—Foley & Lardner

[57] ABSTRACT

A cargo dump trailer including a trailer frame having a fifth wheel connecting pin at the front end and an axle assembly extension slideably mounted in the other end, a cargo box pivotally mounted on the rear end of the trailer frame, the axle assembly extension being moveable from a position with the axle assembly located beneath the cargo box to an extended position with axle assembly located a distance from the back of cargo box equal to the distance of the front of the cargo box from the fifth wheel pin.

13 Claims, 3 Drawing Sheets

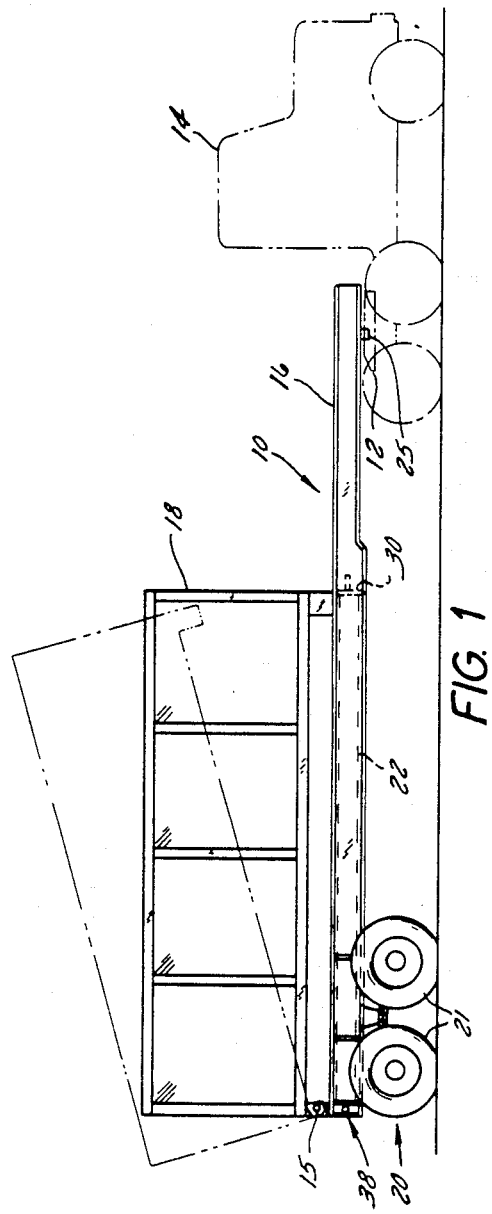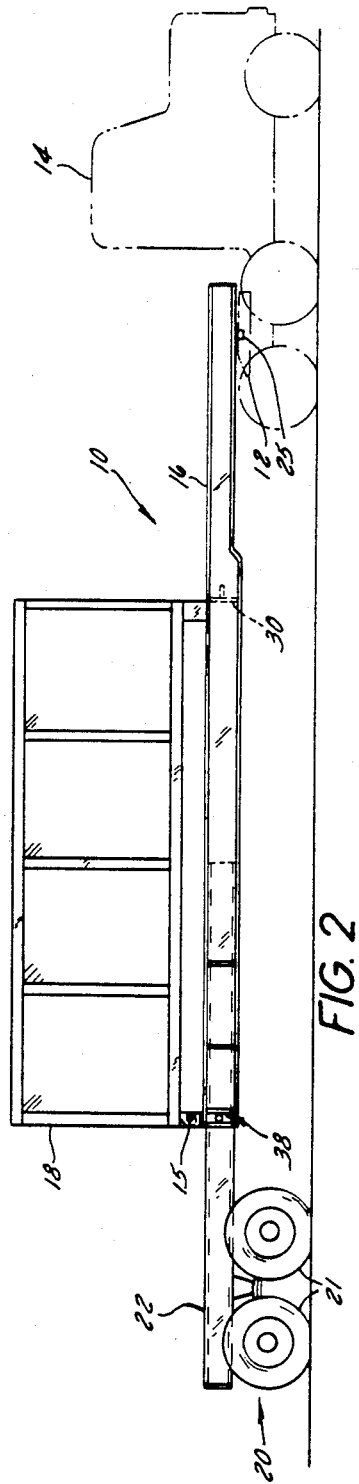

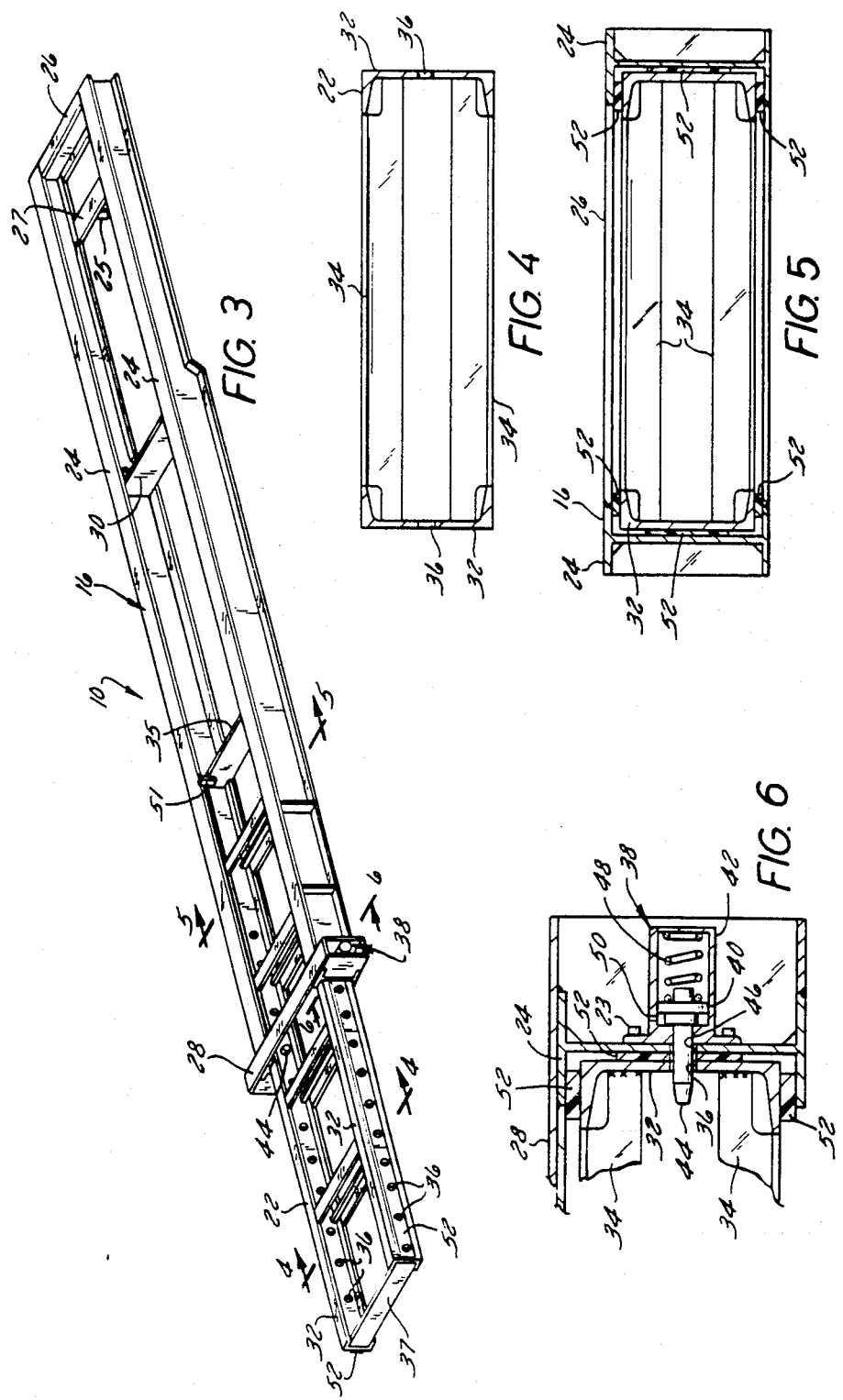

LOAD BRIDGING DUMP TRAILER

BACKGROUND OF THE INVENTION

Cargo trailers are designed to split the load weight between the fifth wheel and the rear axle in order to comply with bridge load laws. The cargo box generally extends from the fifth wheel to the end of the trailer over the rear axle. In order to comply with local bridge laws, the wheel axles are spaced apart a minimum distance of approximately 32 feet. If the cargo box extends from the fifth wheel to the axle the wheel weights are approximately equal. However, if the box is used as a dump box, there is a tendency for the trailer to tip when the box is elevated because of its length. This can be caused by uneven loading of the box or if the box is exposed to high wind conditions. To minimize this effect, the cargo box has been reduced in length with a corresponding increase in depth in order to carry the same load. However, the load weight is now concentrated on the rear axle wheels of the trailer. This produces a higher wheel load at the rear of the trailer which may not comply with bridge load laws.

SUMMARY OF THE INVENTION

The cargo dump trailer according to the present invention provides for the even distribution of weight between the fifth wheel and the rear wheels, in order to comply with local and Federal Interstate bridge laws and weights when transporting the load and also minimizes the tipping tendency of the trailer when the box is elevated. This has been achieved by providing a movable extension frame within the trailer frame which allows the rear tandem axle assembly to be moved rearwardly a distance equal to the distance of the load center of the box from the fifth wheel axle coupling. The load weight of the cargo box will then be located at substantially equal distances from the rear axle assembly and the fifth wheel axle coupling thus distributing the wheel weight evenly between the wheels. At the destination point the rear axle assembly can be returned to a position under the cargo box which allows for the dumping of the cargo off of the end of the trailer frame.

BRIEF DESCRIPTION OF THE DRAWINGS

FIG. 1 is a side view in elevation showing a trailer with the rear axle assembly under the cargo box.

FIG. 2 is a side view of the trailer showing the rear wheel axle assembly extending rearwardly from the end of the trailer frame.

FIG. 3 is a perspective view of the trialer frame and axle assembly extension frame.

FIG. 4 is a view taken on line 4—4 of FIG. 3 showing a cross-section of the extension frame construction.

FIG. 5 is a view taken on line 5—5 of FIG. 3 showing a cross-section of the trailer frame and extension frame.

FIG. 6 is a view taken on line 6—6 of FIG. 3 showing a cross-section of the lock mechanism for locking the extension frame in the trailer frame.

DETAILED DESCRIPTION OF INVENTION

Figure 7:
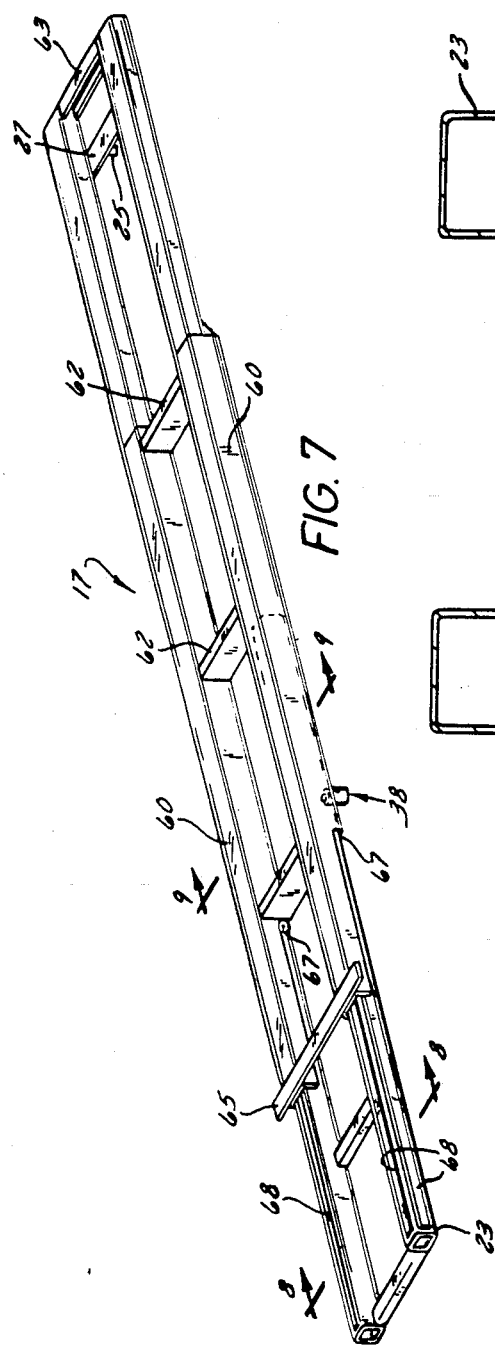
FIG. 7 is a perspective view of an alternate embodiment of the trailer frame and extension frame.

The cargo trailer 10 as seen in FIGS. 1 and 2 is shown connected to the fifth wheel 12 on a tractor 14. The trailer 10 generally includes a main trailer frame 16, a cargo box 18 and a tandem axle assembly 20 mounted on the (wheel or) axle assembly extension 22. The cargo box 18 extends from the rear of the frame 16 forwardly a distance short of the fifth wheel 12. The box can be mounted for pivotal movement on said frame by means of pivot pins 15 if used as a dump trailer. The box can be pivoted by any conventional hydraulic or pneumatic system.

Referring to FIG. 1, the rear wheel axle assembly 20 includes a set of wheels 21 and is shown located directly under the rear end of the cargo box 18. In this position, the major portion of the cargo box load will be concentrated on the rear wheels 21 with a minimum load on the fifth wheel 12 because the front of the box is spaced from the fifth wheel 12. In FIG. 2 the axle assembly extension 22 is shown moved rearwardly a distance sufficient to distribute the load between the axle assembly 20 and the fifth wheel 12. The axle or wheel loads will be equal when the distance of the axle assembly 20 from the center 15 of the cargo box 18 is the same as the distance of the center 15 of the cargo box from the fifth wheel 12.

Referring to FIGS. 3–6, one form of trailer frame 16 is shown which includes a pair of eye beams 24 connected at the front by an I-beam 26 and at the rear by a top plate 28. A stop plate 30 is provided between the I-beams 24 to limit the movement of the axle assembly extension 22 into the frame 16. A fifth wheel connecting pin 25 is shown mounted on a plate 27 located at the forward end of the trailer frame 16.

The axle assembly extension 22 is formed from a pair of C-beams 32 which are cross-connected by eye beams 34. The front of the extension 22 is closed by a plate 35 and the rear by plate 37. A series of holes 36 are provided in the web of each of the C beams 32.

Means are provided for locking the extension 22 at selected positions with respect to the frame 16. Such means is in the form of a lock assembly 38 mounted on one of the I-beams 24. The lock assembly 38 includes a piston 40 and cylinder 42 mounted on the web of the eye beam 24 by bolts 23. A tapered pin 44 is secured to the piston 40 and extends through an opening 46 in the eye beam 24 and one of the openings 36 in the C-beam 32. The piston 40 is biased by means of a spring 48 to the locking position with the pin 44 extending through one of the openings 36 in the axle extension. The lock assembly 38 can be activated from either a pneumatic or hydraulic pressure source. In this regard an opening 50 is provided in the cylinder 48 which is in communication with the side of the piston 40 opposite the spring 48. An increase in pneumatic or hydraulic pressure will move the piston 40 outward to withdraw the pin 44 from the opening 36. The lock assembly can be actuated from the cab of the vehicle or from the rear of the trailer as desired.

Means are provided for supporting the extension 22 for sliding movement within the trailer frame 16. Such means is in the form of a number of neoprene blocks 52 located at the top, bottom and side of the C-beams 36. Although neoprene blocks have been shown, it is within the contemplation of this invention to use alternate means such as roller bearings or the like for providing free movement of the axle extension with respect to the trailer frame. A stop block 51 can be provided on one of the I-beams 34 to limit the outward movement of the extension on engagement with the cross bar 28.

In operation, the extension 22 is extended from the trailer frame 16 by releasing the lock assembly 38 and setting the brakes for the wheels 21 in the rear axle assembly 20. The tractor 14 is then driven forward to pull the axle extension 22 out of trailer frame 16. The extension 22 is returned or pushed into the frame 16 by backing the tractor toward the rear axle assembly 20 also with the brakes set.

Figure 8:
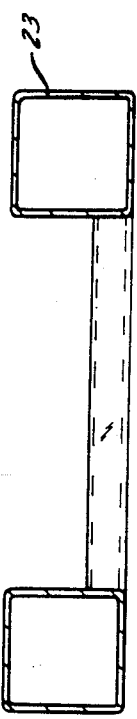
FIG. 8 is a view taken on line 8—8 of FIG. 7 showing a cross-section of the extension frame.
Figure 9:
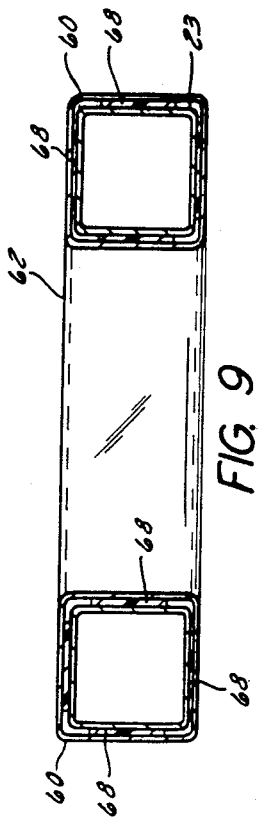
FIG. 9 is a view taken on line 9—9 of FIG. 7 showing a cross-section of the extension frame and trailer frame.

In the alternate embodiment of the invention shown in FIGS. 7, 8 and 9, the trailer frame 17 is formed from box beams 60 which are interconnected by cross-plates 62, end plate 63 and cross member 65. The ends of the beams 60 are cut out at 67 to provide room for the axle assembly 20. The axle extension 23 is also formed from box beams 64 which are cross-connected by bars 66. The extension 23 is supported for movement in the box beams 60 by means of the neoprene pads 68. The extension 23 is locked in position in the frame 17 by means of a lock assembly 38 as described above located on the bottom of one of the beams 60.

The embodiments of this invention in which an exclusive property of privilege is claimed, are defined as follows:

1. A cargo dump trailer comprising a substantially elongate trailer frame having a coupling means at one end for coupling the frame to the fifth wheel of a vehicle, a cargo box mounted on said frame at a spaced distance from said coupling means and a rear extension frame having an axle assembly mounted thereon, said extension frame being slideably mounted in said trailer frame for movement between a first position within said trailer frame under said cargo box to a second position rearwardly from said trailer frame with said axle assembly located a distance from said cargo box equal to the distance of said coupling means from said cargo box whereby the wheel loads at the fifth wheel and at the axle assembly will be substantially equal when said rear extension frame is in the second position.

2. The cargo dump trailer according to claim 1 including means for locking said extension frame to said trailer frame.

3. The cargo dump trailer according to claim 1 or 2 wherein said trailer frame includes two elongate I-beams mounted in a parallel spaced relation and said extension frame includes two C-beams mounted in a parallel spaced relation and positioned to slide on the inside surfaces of said I-beams.

4. The trailer according to claim 3 including means for supporting said extension frame for sliding movement within said trailer frame.

5. The trailer according to claim 4 including means for pivotally mounting said cargo box on said trailer frame.

6. The trailer according to claim 1 or 2 wherein said trailer frame includes two elongate box beams mounted in a parallel spaced relation and said extension frame is formed from two elongated box beams mounted in a parallel spaced relation and positioned to slide within said trailer frame box beams.

7. The trailer according to claim 6 including means for supporting said extension frame for sliding movement in said trailer frame box beams.

8. A cargo dump trailer comprising a trailer frame having a fifth wheel coupling pin at one end for coupling said trailer frame to the fifth wheel of a vehicle, a cargo box mounted on said trailer frame at a spaced distance from said coupling pin, a rear extension frame having a tandem axle assembly mounted thereon, said extension frame being mounted in said trailer frame for movement between a first position with said axle assembly located under said cargo box to a second position rearwardly of said trailer frame with said axle assembly at a distance from the rear of the cargo box equal to the distance of the front of the box from the fifth wheel, and means for selectively locking said extension frame in said trailer frame.

9. The cargo dump trailer according to claim 8 wherein said trailer frame includes two elongate I-beams mounted in a parallel spaced relation and said rear extension frame includes two C-beams mounted in a parallel spaced relation and positioned to slide on the inside surfaces of said I-beams.

10. The trailer according to claim 8 or 9 including means for supporting said extension frame for sliding movement within said trailer frame.

11. The trailer according to claim 10 including means for pivotally mounting said cargo box on said trailer frame.

12. The trailer according to claim 8 wherein said trailer frame includes two box beams mounted in a parallel spaced relation and said rear extension frame is formed from two box beams mounted in a parallel spaced relation and positioned to slide within said trailer frame box beams.

13. The trailer according to claim 6 including means for supporting said extension frame for sliding movement in said frame box beams.

* * * * *